March 13, 1956 L. L. KOROS 2,738,422

FREQUENCY CONTROL

Filed Aug. 25, 1950 3 Sheets-Sheet 1

INVENTOR
Leslie L. Koros
BY
Charles H. Brown
ATTORNEY

INVENTOR
Leslie L. Koros
BY
Charles H. Brown
ATTORNEY

March 13, 1956 L. L. KOROS 2,738,422

FREQUENCY CONTROL

Filed Aug. 25, 1950 3 Sheets-Sheet 3

INVENTOR
Leslie L. Koros
BY
Charles H. Brown
ATTORNEY

United States Patent Office 2,738,422
Patented Mar. 13, 1956

2,738,422

FREQUENCY CONTROL

Leslie L. Koros, Camden, N. J., assignor to Radio Corporation of America, a corporation of Delaware Application August 25, 1950, Serial No. 181,331

6 Claims. (Cl. 250—36)

This invention relates to frequency control of oscillators. More particularly, it relates to the control of frequency of ultra high frequency (U. H. F.) or microwave oscillators, such as magnetrons or kylstrons.

An object of this invention is to devise an effective means for controlling the frequency of an U. H. F. oscillator.

Another object is to enable the very accurate control of the frequency generated by an U. H. F. oscillator.

A further object is to devise a rather simple yet very efficient frequency control system for magnetron oscillators, which is economical as to the control or auxiliary power required.

According to this invention, the magnetron carrier frequency may be stabilized or modulated by locking the carrier to a controlled frequency. This controlled frequency may be very stable or, alternatively, may be frequency or phase modulated in accordance with intelligence, to thereby respectively stabilize or modulate the magnetron carrier. For frequency control, the frequency of the controlled or magnetron oscillator is made to follow the frequency of the standard or locking source.

The invention is very useful also in cases wherein the oscillator, e. g. magnetron or klystron, is amplitude modulated by means of changing the current or voltage of some feeding D. C. source. The carriers of amplitude modulated oscillators are subject to undesired frequency deviations. The circuits described here represent efficient means to reduce such parasitic frequency changes to a fairly low level.

The foregoing and other objects of the invention will be best understood from the following description of some examples thereof, reference being had to the accompanying drawings, wherein.

Briefly, the objects of this invention are accomplished in the following manner: Power is absorbed from a continuously operable magnetron or other type of oscillator at a repetition rate which is either subhormonically related to the oscillator output frequency or is the same as such output frequency or a multiple thereof. This repetition rate of power absorption is controlled by a stable frequency or control frequency source, by means of a loading device which is controlled by such source. In this way, the frequency of the oscillator is controlled without injecting any power into it. In this invention, power is extracted from the oscillator at controlled time intervals.

In an experimental setup built in accordance with this invention, a magnetron, type A–128, was frequency stabilized at 750 megacycles. No. R. F. power was injected into the magnetron system nor was any other kind of stabilization applied. The plate of a type 4X150A tetrode vacuum tube was coupled in parallel to the load resistor to absorb magnetron power at predetermined time intervals, when the grid of the 4X150A was driven to make this tube conductive. Such grid was excited with a frequency equal to one-half the magnetron frequency.

However, it is not at all necessary that a frequency of this value be used. Excitation of the grid at the magnetron frequency gives similar results. A lower-order subharmonic works also.

Figure 1:
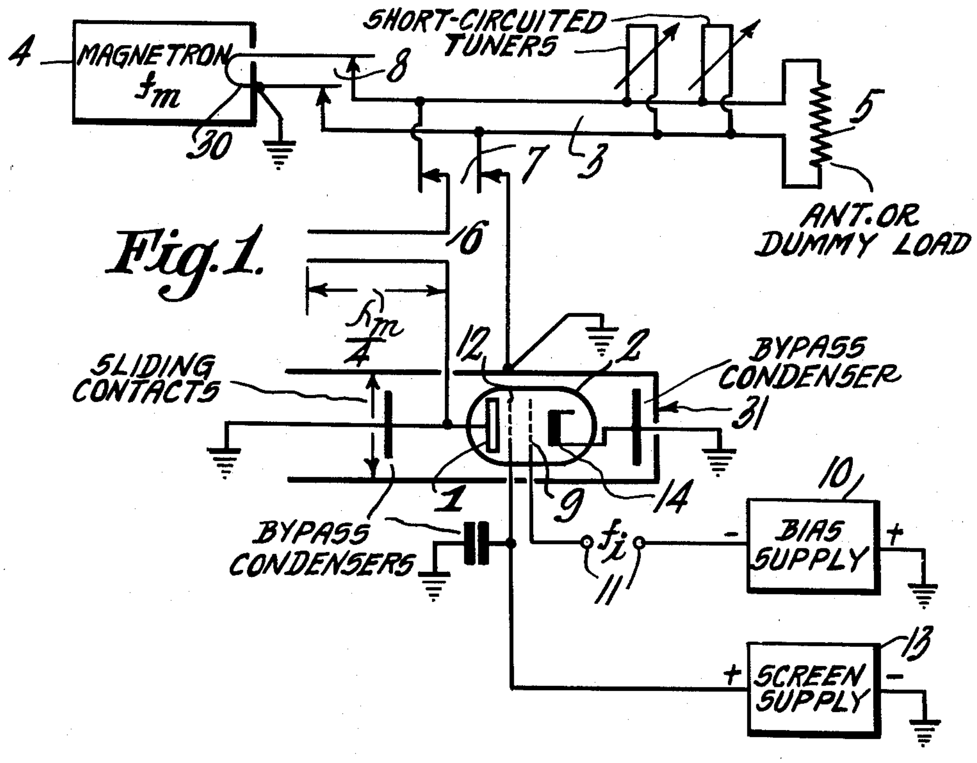
Fig. 1 is a schematic representation of a frequency control arrangement according to this invention.

Fig. 1 shows a typical circuit arrangement according to the invention. For ease of illustration, the concentric transmission line actually used is shown as an open wire line. Plate 1 of the tetrode loading vacuum tube 2 is connected for alternating current directly to the center conductor of the main transmission line 3 which couples the output of magnetron oscillator 4 (of frequency $f_m$) to the dummy load or antenna 5. For the sake of simplicity of illustration, the magnetron 4 has been shown as a box, although it should be understood that it includes the customary means for producing a magnetic field. Tube 2 may be of the 4X150A type or some other electron tube, which can be used at the oscillator frequency. This tube is coupled to a surrounding tuned circuit (cavity) which is tuned to the desired oscillator frequency. The open circuited quarter-wavelength transmission line 6 in series with the plate 1 of the loading tube represents a short-circuit for R. F. but separates the D. C. plate current of tube 2 from the transmission line, so that it can be measured between the plate 1 and the ground connection. The line between plate 1 and main line 3 also includes, for adjustment purposes, a line stretcher or adjustable trombone line section 7.

Any kind of oscillator can be controlled by this invention. Oscillators which especially may need a control of frequency according to this invention, and of the type to which this invention mainly relates, may be termed diode cavity-type oscillators or two-electrode discharge device oscillators, since they generally have two electrodes analogous to an anode and a cathode and also include one or more resonant cavities or cavity resonators. Examples of such oscillators are magnetrons or klystrons.

No. D. C. plate voltage is applied (in the setup of Fig. 1) to the loading tube, plate 1 being connected directly or through a plate current measuring instrument to ground. We will see later, however, that the absence of a D. C. plate voltage is not a basic requirement. Another adjustable line stretcher 8 is inserted in the main transmission line 3 between magnetron 4 and the junction between plate 1 and line 3. The closed end of the line stretcher 8 is coupled to a loop 30 which is inserted into the resonant cavity of the magnetron. If the oscillator 4 should be a klystron, the loop 30 would be inserted into the resonant cavity of the klystron. The R. F. output voltage of magnetron 4, phased properly by line stretchers 7 and 8 and tuned by the length of the cavity 31 of the loading tube, produces an R. F. plate voltage for loading tube 2. The loading tube's cavity 31 is tuned electrically to an odd multiple of a quarter wavelength.

The control grid 9 of tube 2 is biased to cut-off by the negative bias supply 10 the positive side of which is grounded, as is the cathode 14 of tube 2. The excitation voltage or input frequency or control frequency $f_i$ is applied to two terminals 11, which are in series in the lead between the negative side of supply 10 and control grid 9.

The screen grid 12 of tube 2 is biased positively with respect to the cathode of such tube by a screen supply 13 the positive side of which is connected directly to grid 12 and the negative side of which is grounded.

In the experimental setup, the control frequency $f_i$ was one-half of the magnetron frequency $f_m$, although the invention is not to be deemed limited in any way to this frequency relation. Although the loading tube 2 is biased to cut-off by bias supply 10, its plate is coupled in parallel to the load resistor 5, so that this tube absorbs power from the magnetron 4 if its control grid 9 is driven above cut-off by the excitation or control voltage $f_i$.

In a typical experiment, tube 2 was a type 4X150A, with 140 volts (negative) bias on its control grid. The excitation $f_i$ on the control grid 9 was 5 to 10 watts at 375 mc., the magnetron frequency being 750 mc. The loading tube had a conduction time of 120 electrical degrees at 375 mc. The observed control grid current was +6 milliamperes, this current being measured by means of a meter connected between ground and the positive side of 10. The screen grid voltage (provided by screen supply 13) was +200 volts, the measured screen grid current being +62 milliamperes. The screen grid current was measured by means of a meter connected between supply 13 and grid 12.

The cathode current, measured by a meter connected between cathode 14 and ground, was +48 milliamperes. The measured plate current was −20 milliamperes. The magnetron plate input was 500 milliamperes at 2,200 volts.

The magnetron locking range (i. e., the frequency range over which the magnetron was pulled in or locked in to its correct frequency) was 1.3 mc. The magnetron output at 750 mc. was about 200 watts.

The observed plate current of the loading tube was an inverted current, obviously produced by secondary emission on the plate. In some other experiments, an inverted plate current of up to 35 milliamperes was observed. The loading tube grid current was also inverted in some cases.

The experiments performed according to this invention have shown an important result. The 750 mc. output of the magnetron oscillator 4 can be stabilized with a low R. F. power of only 5 to 10 watts at 375 mc., this power being used to excite a tube 2 acting as a power absorber. No R. F. locking power was injected into the magnetron. The D. C. screen input for the loading tube was only 12 watts.

The frequency $f_i$, which governs the repetition rate of absorption of power from the oscillator, must be harmonically related to the oscillator output frequency, or it can be equal to the oscillator frequency $f_m$. The oscillator is controlled in frequency by the loading thereof, or by the absorption of power therefrom, at predetermined time intervals.

The control system described can be utilized to stabilize carriers, especially U. H. F. or microwave carriers, if the control frequency $f_i$ is a stable one. It can be utilized to produce frequency or phase modulated carriers, if the control frequency is frequency or phase modulated.

The control system of this invention can be utilized at lower frequencies, also. However, for frequencies up to about 500 mc. there are somewhat simpler frequency control methods available. Therefore, this invention finds its greatest use at frequencies in the U. H. F. or microwave range.

In my copending but now abandoned application, Serial No. 177,455, filed August 3, 1950, there were disclosed frequency control systems in which R. F. power, from a standard or control source, was injected into the oscillator cavity, in special cases into a klystron or into a magnetron cavity, in order to lock the frequency of the diode type oscillator output to a standard or control frequency, thereby stabilizing operation of the oscillator. The power which is produced for injection purposes in the cavity of an R. F. amplifier suffers losses in the transmission line leading to the magnetron cavity and in the cavity itself. In a stabilizing-by-loading system according to the present invention, however, all the losses in the system represent useful extracted power. If A is the efficiency of the power connection system and oscillator cavities, the oscillator receives, from $P_i$ injected power, only $AP_i$. However, if $P_i$ power is absorbed in the loading tube, we take $P_i/A$ from the oscillator. A is less than unity, so the loading-stabilizing system needs a tube with less plate dissipation capacity for the same power level. The ratio of necessary plate dissipation capacities for the two systems can be two or more. This may represent a further advantage of the present loading-stabilizing system.

Figure 2:
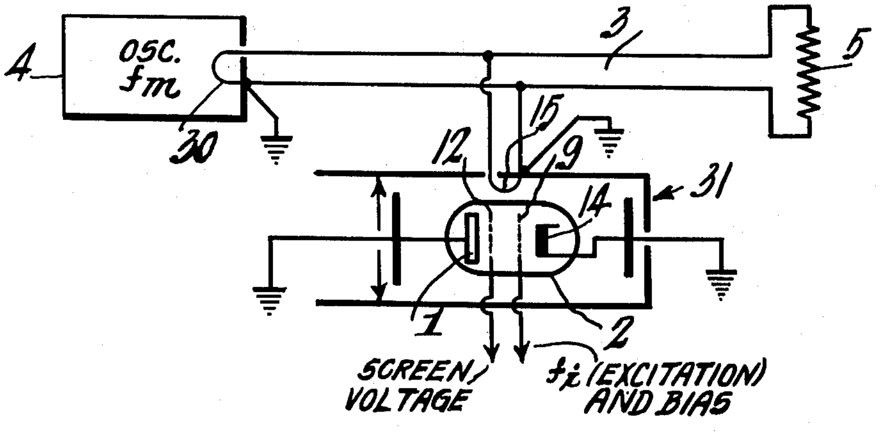
Figs. 2–4 are representations of modified coupling arrangements.

The loading-stabilizing tube 2 in Fig. 1 is coupled directly to the oscillator 4, without the interposition of any voltage transforming elements. If the internal resistance of the loading tube is too high, or too low, a step-up or step-down transformer, respectively, may be connected between the loading tube and the main transmission line. Fig. 2 is an example of an arrangement including a transformer element. In this figure, elements the same as those of Fig. 1 are designated by the same reference numerals. In Fig. 2, in order to couple the loading tube 2 to the main transmission line 3, there is a loop coupling 15 in the cavity 31 of such tube, the tube being a grounded cathode tetrode as in Fig. 1. In this case the voltage of oscillator 4 is transformed, the size and position of the loop in the cavity 31 determining the voltage transformation ratio.

Figures 3, 4, 5:
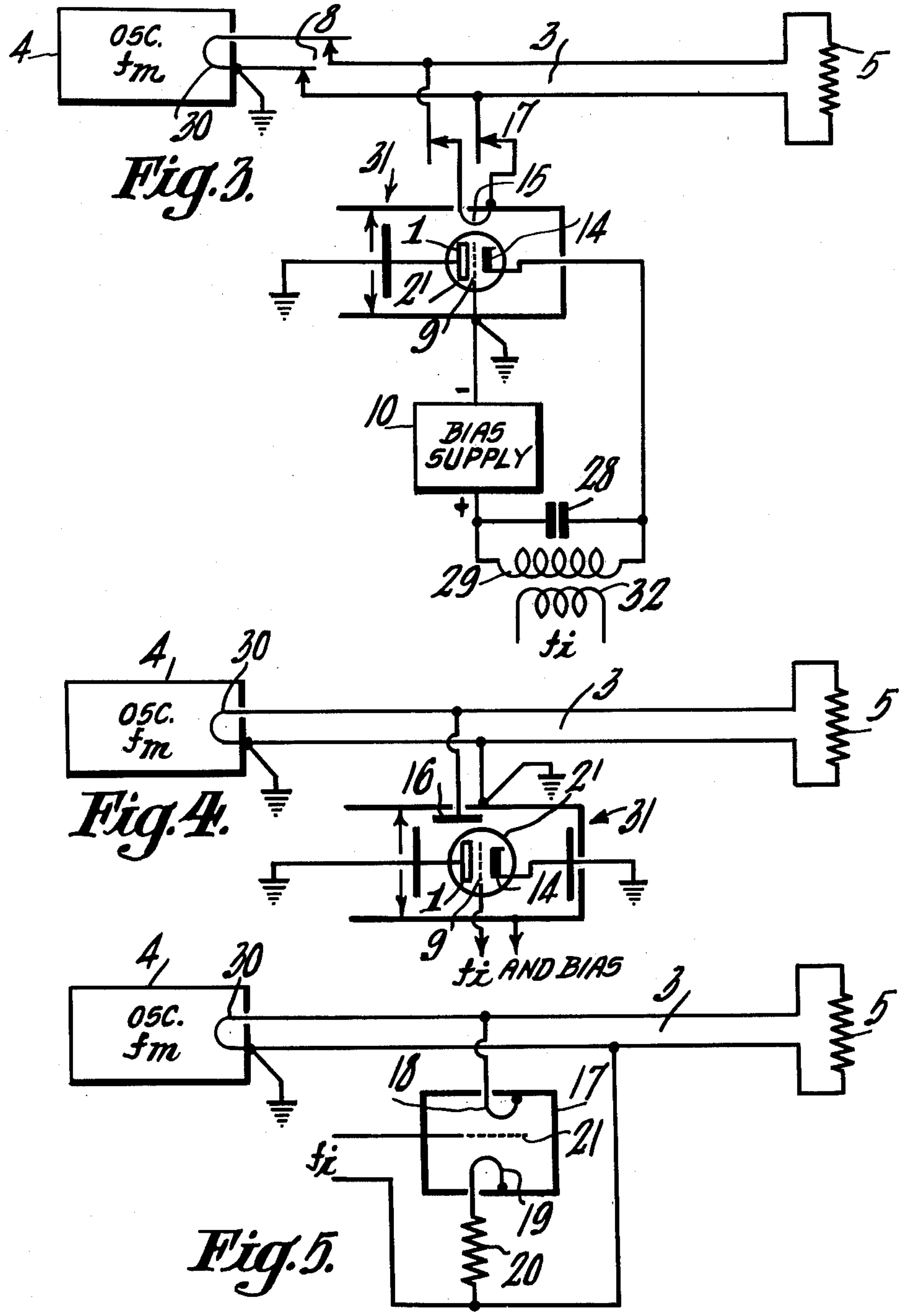
Fig. 5 is a representation of a modified system.

Fig. 3 is another example of an arrangement including a transformer element. Here, in order to couple the loading tube 2' to the main transmission line 3, there is a loop coupling 15 in the cavity 31 of tube 2'. In Fig. 3, the tube 2' is a grounded grid loading triode. Here, as in Fig. 2, the voltage of oscillator 4 is transformed, the size and position of the loop in the cavity 31 determining the voltage transformation ratio. Condenser 28 and coil 29 are tuned to the control frequency $f_i$. The control power is applied to the coil 32. 29 and 32 are coupled magnetically. The excitation voltage for the grid of tube 2' is applied by the tank circuit (28 and 29) between the cathode 14 and the bias supply, which is at ground potential for R. F. The line stretchers 7 and 8 have in this case the same functions as in Fig. 1. These elements determine the phase relation of the loading tube 2', compared with other elements of the circuit. 7 and 8 may be used also as voltage transformer elements, if the lengths of the transmission lines are properly adjusted thereby for the best control effect. The use of line stretchers, of course, is not a requirement of the system; they represent only appropriate devices for adjustment. Similar effects can be produced by inductances or capacitances in series or in parallel with the connecting transmission lines. These reactive elements could be built as open or short-circuited transmission lines, or as coils or condensers and they may or may not be adjustable.

Fig. 4 is another example of an arrangement including a transformer element. Here, in order to couple the loading tube 2' to the main transmission line 3, there is a capacitive plate coupling 16 in the cavity of tube 2'. In Fig. 4, the tube 2' is a cathode grounded loading triode. The voltage of oscillator 4 is transformed here also, the size, position and configuration of the plate 16 in the cavity 31 determining the voltage transformation ratio.

Fig. 5 discloses another arrangement for loading the magnetron oscillator 4. Here, an electronic power switch 17, for example a device, constructed similarly to a so-called electron coupler, has its input loop 18 connected to one conductor of transmission line 3 and has its output loop 19 connected through a loading resistor or dissipative load 20 to the other conductor of line 3. The control or input frequency $f_i$ is applied between the grid 21 of device 17 and the ground connection, with bias voltage in series, if necessary. In this arrangement, dissipative load 20 is coupled to oscillator 4 through the electron control device 17 which opens or closes the power flow path to such load at the rate of the control frequency $f_1$. Here, as in all of the preceding figures, the oscillator is loaded at predetermined time intervals which are the inverse of the repetition rate of the control frequency $f_1$. Frequency control of such oscillator is thereby achieved. Electron tubes with relatively low internal resistance can be used also for power switch 17.

The loading tube can be a gas discharge tube, such as a thyratron or a glow discharge tube. The only important requirement is that the control frequency must change the conductivity of the loading device. This requirement calls for a very short deionizing time, if the oscillator frequency is high. The deionizing process must not be fully completed in the idle periods of the loading device, but the ionization must be reduced considerably, so that a pulsation of power absorption occurs. A glow discharge tube with cold or heated electrodes, pre-ionized by the control frequency, would also give a practical result.

Figures 6, 7, 8:
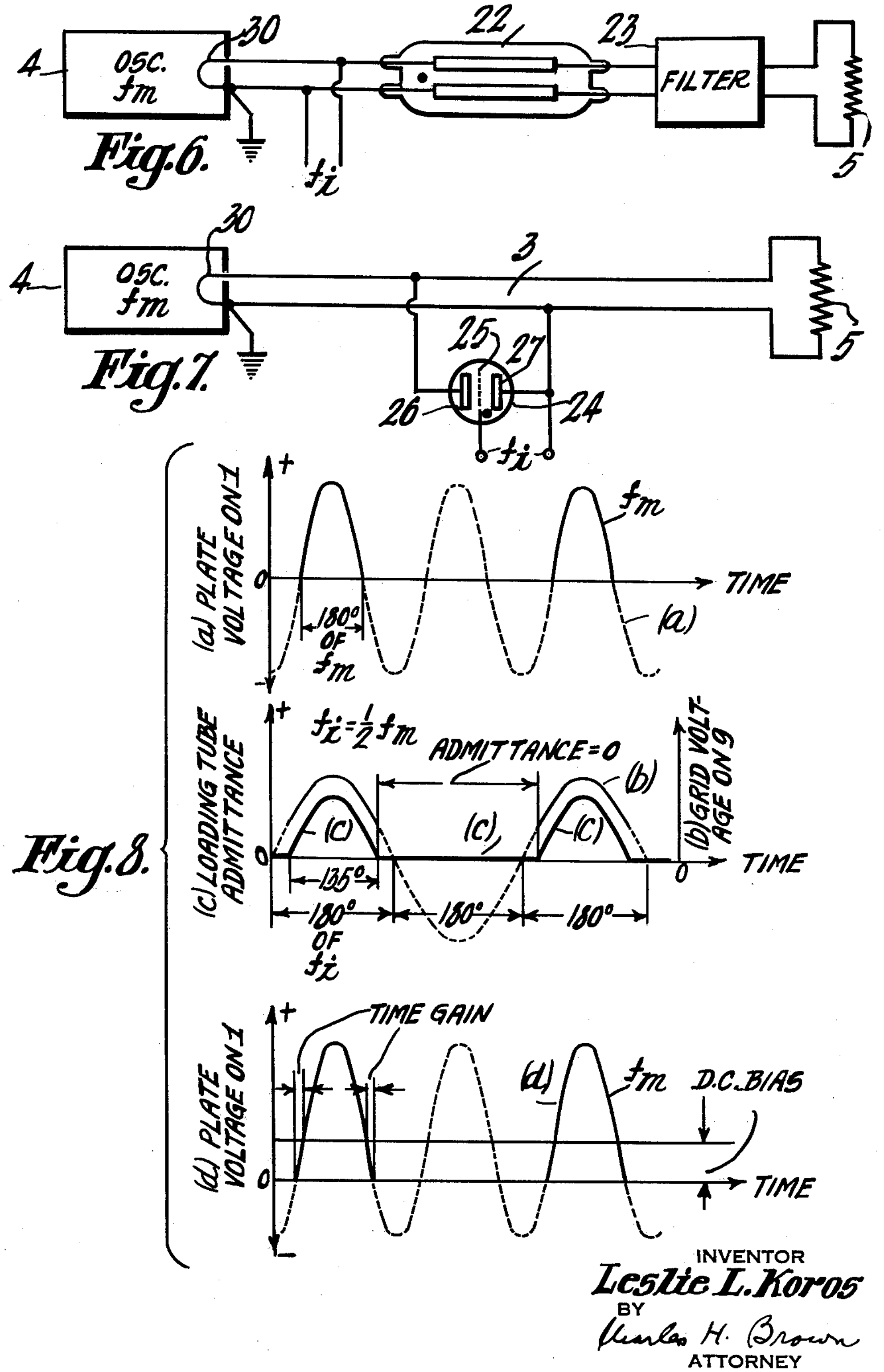
Figs. 6 and 7 are representations of modified arrangements.
Fig. 8 is a set of curves useful in explaining an aspect of the invention.

Figs. 6 and 7 show gas discharge loading tubes in arrangements according to this invention. First referring to Fig. 6, a gas discharge loading tube 22, of very short deionizing time, is connected in parallel with oscillator 4, or in other words, directly in the main transmission line between oscillator 4 and its load 5. Tube 22 can be built as a section of coaxial transmission line, e. g., as an tube with coaxial electrodes, or as a conventional tube. The gaseous discharge between the two electrodes in 22 is cut off if only the relatively low oscillator voltage is on the transmission line. The oscillator voltage is, e. g., 223.5 volts R. M. S. if 1,000 watts are transmitted by a matched 50-ohm line to the load. The control frequency, $f_1$, may be a submultiple of the oscillator frequency $f_m$, e. g., $f_1$ can be selected as one-half of $f_m$ and may be applied between the two electrodes of tube 22, as indicated. When the control voltage $f_1$ is applied, the gas tube 22 is ionized and loads the oscillator 4, thereby causing frequency locking of the oscillator. The voltage of the $f_1$ power on the tube 22 may be as high as 500 volts. If the input frequency $f_1$ is one-half of the desired oscillator frequency $f_m$, this arrangement assures a loading rate or periodicity which is the same as the oscillator frequency, due to the frequency doubling effect of the alternating current driven gas discharge.

A filter 23 is interposed in the main transmission line between tube 22 and the load 5. This filter is designed to serve as a rejection filter for the control frequency $f_1$. It will be remembered that the frequency $f_1$ is one-half of $f_m$ so the two frequencies can be easily separated by means of a filter. Any other submultiple $f_1$ frequency can be separated also by adequate high pass filters.

Now referring to Fig. 7, a gas discharge loading tube 24, having a starting electrode 25 and two main electrodes 26 and 27, is provided. Tube 24 is connected across the main transmission line 3, between the oscillator 4 and its load 5, by connecting electrode 26 to one conductor of said line and electrode 27 to the other conductor of said line. The control frequency $f_1$ is applied between starting electrode 25 and main electrode 27. The control voltage, acting on auxiliary electrode 25, ignites the gas discharge tube 24. When tube 24 is ionized or ignited, the oscillator 4 is loaded, thereby causing frequency locking of the oscillator. Tube 24 can be built also as a concentric transmission line, enclosed in a vacuum tight envelope.

The systems illustrated in Figs. 1–5 can be modified and somewhat improved in action by providing a push-pull loading tube arrangement. The two loading tubes would be connected in parallel to the load and would be excited in push-pull by the control or input voltage. Such a system is especially efficient if the control frequency is one-half of the desired oscillator frequency, for then there would be loading periods present in each of the oscillator cycles. This would provide improved frequency control action on the oscillator.

In any of the previously-described arrangements, if the source of control voltage which produces the frequency $f_1$ is frequency or phase modulated, the oscillator 4, e. g. a magnetron oscillator, may be made to follow this modulation, thereby frequency or phase modulating such oscillator. In addition to modulation of the carrier, the inherent FM or PM noise of the oscillator carrier is reduced in this way.

In my copending application, Serial No. 80,241, filed March 8, 1949, which ripened on July 22, 1952, into Patent No. 2,604,533, there are described several systems for obtaining amplitude modulated frequency spectra (or equivalent amplitude modulated carriers) from frequency or phase modulated carriers. The frequency and phase modulation systems for oscillators, described herein and mentioned in the preceding paragraph, can be used to produce the frequency or phase modulated U. H. F. carriers required (and utilized) in the systems of said copending application.

Chireix, in expired Patent No. 1,882,119, dated October 11, 1932, discloses an amplitude modulation system wherein out-of-phase oscillations in two paths are phase modulated oppositely or in push-pull, the outputs in these two paths then being combined in a common antenna to produce amplitude modulation of the combined signal. Obviously, the Chireix system may be utilized where there are separate oscillators in the two paths. According to this invention, the known "out-phase" modulation system of oscillators, disclosed by Chireix, can be combined with the frequency-locked, phase-modulated systems heretofore described. For such a combination, two oscillators would be used, these being phase modulated in push-pull by two phase modulated loading devices. The loading devices would be excited from the same R. F. source. Each separate oscillator would then be phase modulated by the action of its own phase modulated tube, in the manner heretofore described. The outputs of the two oscillators would be diplexed to a common load or antenna, somewhat in the manner shown by Chireix, to produce amplitude modulated carrier.

The loading devices of this invention can be coupled to the transmission line, directly in parallel with the load, or at any desired distance from the load.

Furthermore, the loading devices can be applied to the line as a termination of resistance transforming elements. Obviously, with different coupling arrangements, as for example with quarter-wavelength transmission lines, low reactance or low resistance can be coupled into the transmision line if the loading device has a high resistance, and vice versa.

If the periodic loading is applied at the end of a one-to-one transformer, e. g. to the end of a half-wavelength transmission line, the impedance property of the loading system can be used unchanged. The phase of the loading, however, can be changed to 180° with a magnetron frequency of a connection an odd multiple of a half-wavelength long is used between the periodically active loading element and some arbitrary plane of the transmission line at which the loading effect is desired. Therefore, push-pull loading can be produced by means of transmission lines of different lengths for two in-phase-driven loading elements.

Push-pull loading can also be obtained by proper phasing of the loading time intervals. In a practical design this can be achieved by selecting the relative lengths of the transmission line connections for the control input terminals of the two loading units, such units being excited from the same R. F. source.

The advantages of transmission line combinations can be obtained in versatile form if bridge or diplexer circuits are inserted into the connection between the oscillator and load. The intermittent, periodic loading is applied to one pair of bridge terminals; power transfer effects from the oscillator to a load can be observed on another pair of terminals.

The loading control system, especially if it comprises a single loading device, acts during a relatively short time. As an example, we may consider the circuit of Fig. 3. If the exciter tank, composed of condenser 28 and inductance 29, is excited with a frequency equal to one-half of the oscillator output frequency, $f_m$, the loading effect will be present at every second cycle of $f_m$. Fig. 8, which will be later described in detail, represents the situation. The loading effect, however, can be produced in this circuit only if the oscillator output voltage produces a positive instantaneous plate voltage for plate 1 to ground. Consequently, the loading effect can not be produced longer than during one-fourth of the time. If the oscillator output voltage follows a sine wave law, the highly efficient loading time is still more reduced, because the sine-wave-shaped plate voltage has its highest, and therefore most effective value, only around the positive peaks of $f_m$.

Means may be provided to increase the loading time. One such means may be provided by the connection of an inductance in series with the plate 1. A high-valued inductance converts, as is known, the sinusoidal voltage from a half sine wave into substantially a square pulse.

Another method to achieve longer loading time is to bias the plate 1 positive to ground with an additional D. C. voltage. The R. F. plate voltage delivered by the oscillator 4, plus the added D. C. voltage, under these conditions keeps plate current flowing longer in tube 2'. Thus, the loading time is increased. The D. C. bias voltage can be connected between plate 1 and ground in the same way as a D. C. plate power supply is connected.

If the plate cavity of 2' is tuned to $f_m$, tube 2' acts in many circuits not only as a loading device, but may produce also R. F. power as a frequency doubler. In the circuits, however, where no additional D. C. plate voltage is applied, the effect of the output R. F. power of tube 2' is generally low as compared to the loading effect. If D. C. voltage is applied, the R. F. producing effect of tube 2' increases. The frequency control effect of the loading is combined in such cases with the frequency control effect of an injection system. Such an injection control system is described in my copending application, Serial No. 177,455, filed August 3, 1950.

To adjust the system to the optimum control effect, the line stretchers 7 and 8 should be adjusted to produce a high $f_m$ voltage on plate 1. To adjust the system for the optimum effect, it is a good engineering practice, as a first step, to connect plate 1 to ground without D. C. bias and to maximize the loading frequency control effect by changes of the line lengths and/or by tuning the cavity of tube 2'. The next step is to apply a D. C. bias voltage to 1 to increase the frequency locking range.

Fig. 8 represents the loading time distribution in a loading frequency control system with unbiased and with biased plate. The reference numerals in Fig. 8 are related to Fig. 3. In Fig. 8, (*a*) is the curve of R. F. plate voltage on plate 1, if it is connected as shown in Fig. 3. Curve (*b*) represents the grid voltage on the loading tube. Curve (*c*) represents, as an example, in the $f_m=2f_i$ case the admittance of the loading device. For this curve, there was selected 135 electrical degrees of $f_i$ admittance "on" time. Obviously, this is only an example. For a given type of loading tube, the admittance "on" time depends on the negative D. C. grid bias and on excitation voltage amplitude. Loading effect can be produced if the voltage on plate 1 is positive and if an admittance of the loading device is present. The ineffective (for frequency control) R. F. plate voltage in (*a*) of Fig. 8 is dashed. In Fig. 8, (*d*) represents the combined R. F. and D. C. voltage on the loading tube plate. The idle plate voltage cycles are dashed also in this case. The time gain, produced by the D. C. bias, is shown adjacent the wave (*d*). No time gain can be obtained beyond the admittance "on" time. This characteristic limits the maximum loading-time-increasing effect of D. C. plate bias. The action of tube 2' as a frequency doubler, however, is increased with any additional increase of the D. C. voltage on plate 1.

It is to be understood that the coupling means between the components of this invention can be any kind of power transmission elements, such as concentric transmission lines, wave guides, or open wire transmission lines formed by any different number of conductors as known in the art.

A modulator device and an A. C. source, as, e. g. a microphone, a television pick-up camera, may be coupled to any of the described systems to produce modulated control frequency carriers. Wave angle modulators or amplitude modulators can be used for this purpose.

What I claim to be my invention is as follows:

1. A frequency control system comprising a multicavity magnetron oscillator whose operating frequency is to be stabilized and is in the microwave region of the frequency spectrum, a transmission line coupling the output of said magnetron to a load, an electronic device having an input coupling, an output coupling, and a control element, the conductivity of said device between said couplings depending on the voltage applied to said control element; means including couplings capable of passing direct current connecting said input coupling, said output coupling, and a power absorbing device in series across said line; and means for applying an unmodulated voltage of stable radio frequency to said control element to thereby cause said power absorbing device to periodically absorb oscillatory power from said oscillator at the rate of said stable radio frequency for stabilizing the oscillator operating frequency, said stable radio frequency being a submultiple including unity of the desired operating frequency of the magnetron.

2. A frequency control system comprising a multicavity magnetron oscillator whose operating frequency is to be stabilized and is in the microwave region of the frequency spectrum, a transmission line coupling the output of said magnetron to a load, an electron coupler having an input coupling, an output coupling, a controllable electron flow path between said couplings, and a control element, the conductivity of said path depending on the voltage applied to said control element; means including couplings capable of passing direct current connecting said input coupling, said output coupling, and a power absorbing device in series across said line; and means for applying an unmodulated voltage of stable radio frequency to said control element to thereby cause said power absorbing device to periodically absorb oscillatory output power from said oscillator at the rate of said stable radio frequency for stabilizing the oscillator operating frequency, said stable radio frequency being a submultiple including unity of the desired operating frequency of the magnetron.

3. A frequency control system comprising a multicavity magnetron oscillator whose operating frequency is to be stabilized and is in the microwave region of the frequency spectrum, a transmission line coupling the output of said magnetron to a load, a controllable loading device coupled to said line to absorb oscillatory output power from said oscillator, means so controlling said device as to normally prevent the absorption of power thereby, and means for applying an unmodulated control voltage of stable frequency to said device to cause it to periodically absorb oscillatory output power from said oscillator only at intervals corresponding to the periodicity of said stable frequency thereby stabilizing the oscillator operating frequency, said stable frequency being a submultiple including unity of the desired operating frequency of the magnetron.

4. A frequency control system comprising a multicavity magnetron oscillator whose operating frequency is to be stabilized and is in the microwave region of the frequency spectrum, a transmission line coupling the output of said magnetron to a load, a controllable loading device coupled to said line to absorb oscillatory output power from said oscillator, a voltage transformer in the coupling between the loading device and said line, means so controlling said device as to normally prevent the absorption of power thereby, and means for applying an unmodulated control voltage of stable frequency to said device to cause it to periodically absorb oscillatory output power from said oscillator only at intervals corresponding to the periodicity of said stable frequency thereby stabilizing the oscillator operating frequency, said stable frequency being harmonically related to the desired operating frequency of the magnetron.

5. A frequency control system comprising a multicavity magnetron oscillator whose operating frequency is to be stabilized and is in the microwave region of the frequency spectrum, a transmission line coupling the output of said magnetron to a load, a controllable loading device coupled to said line to absorb oscillatory output power from said oscillator, a reactive element constructed from transmission line constituting a voltage transformer in the coupling between the loading device and said line, means so controlling said device as to normally prevent the absorption of power thereby, and means for applying an unmodulated control voltage of stable frequency to said device to cause it to periodically absorb oscillatory output power from said oscillator only at intervals corresponding to the periodicity of said stable frequency thereby stabilizing the oscillator operating frequency, said table frequency being harmonically related to the desired operating frequency of the magnetron.

6. A frequency control system comprising a multicavity magnetron oscillator whose operating frequency is to be stabilized and is in the microwave region of the frequency spectrum, a transmission line coupling the output of said magnetron to a load, an electron discharge device having at least anode, screen grid, control grid, and cathode electrodes; means coupling said anode and said cathode across said line, means biasing said control grid to normally prevent the flow of current between said anode and said cathode, means for applying an unmodulated control voltage of stable frequency to said control grid to cause current flow between said anode and said cathode to thereby absorb oscillatory output power from said oscillator only at intervals corresponding to the periodicity of said stable frequency for stabilizing the oscillator operating frequency, said stable frequency being harmonically related to the desired operating frequency of the magnetron, and means biasing said screen grid positively with respect to said cathode.

References Cited in the file of this patent

UNITED STATES PATENTS

| | | |
|---|---|---|
| 2,169,725 | Fritz | Aug. 15, 1939 |
| 2,223,058 | Christ et al. | Nov. 26, 1940 |
| 2,241,976 | Blewett et al. | May 13, 1941 |
| 2,301,160 | Finch | Nov. 3, 1942 |
| 2,438,768 | Stewart | Mar. 30, 1948 |
| 2,502,077 | Donal Jr. | Mar. 28, 1950 |
| 2,565,112 | Altar et al. | Aug. 21, 1951 |
| 2,636,988 | Palmer | Apr. 28, 1953 |